United States Patent
Lai et al.

(10) Patent No.: US 8,106,324 B2
(45) Date of Patent: Jan. 31, 2012

(54) TOUCH PANEL AND DRIVING METHOD OF TOUCH PANEL

(75) Inventors: Chih-Chang Lai, Taichung County (TW); Nai-Heng Chang, Taichung (TW)

(73) Assignee: Wintek Corporation, Taichung (TW)

( * ) Notice: Subject to any disclaimer, the term of this patent is extended or adjusted under 35 U.S.C. 154(b) by 458 days.

(21) Appl. No.: 12/389,351

(22) Filed: Feb. 19, 2009

(65) Prior Publication Data

US 2009/0211891 A1 Aug. 27, 2009

(30) Foreign Application Priority Data

Feb. 21, 2008 (TW) .............................. 97106063 A

(51) Int. Cl.
*H03K 17/975* (2006.01)
(52) U.S. Cl. ........................................ 200/600; 200/512
(58) Field of Classification Search ................... 200/600
See application file for complete search history.

(56) References Cited

U.S. PATENT DOCUMENTS

| | | | |
|---|---|---|---|
| 3,798,370 | A | 3/1974 | Hurst |
| 4,661,655 | A | 4/1987 | Gibson et al. |
| 5,736,688 | A | 4/1998 | Barrett et al. |
| 7,109,978 | B2 | 9/2006 | Gillespie et al. |
| 7,208,691 | B2 * | 4/2007 | Bourdelais et al. ............ 200/512 |
| 7,323,814 | B2 * | 1/2008 | Miyazaki et al. ............. 313/495 |

FOREIGN PATENT DOCUMENTS

| | | | |
|---|---|---|---|
| EP | 000225748 A2 * | 6/1987 | |
| KR | 864407 * | 10/2008 | |
| TV | 101490642 | 7/2009 | |
| TW | M321553 | 11/2007 | |

OTHER PUBLICATIONS

2009-E67509, Oct. 2008, Jeong H S.*
"2nd Office Action of China counterpart application", issued on Jul. 13, 2011, p. 1-p. 4., in which the listed reference was cited.
"Office Action of Taiwan Counterpart Application", issued on Jun. 29, 2011, p. 1-p. 11, in which the listed reference was cited.

* cited by examiner

*Primary Examiner* — Elvin G Enad
*Assistant Examiner* — Lisa Homza
(74) *Attorney, Agent, or Firm* — Jianq Chyun IP Office

(57) ABSTRACT

A touch panel including a first substrate, a second substrate, a first conductive layer, a second conductive layer, a third conductive layer, and a number of spacers is provided. The first substrate has an upper surface and a bottom surface opposite to the upper surface. The second substrate is parallel to the first substrate. The first conductive layer is disposed on the upper surface of the first substrate, while the second conductive layer is disposed on the bottom surface of the first substrate. The third conductive layer is disposed on the second substrate and interposed between the second substrate and the second conductive layer. The spacers are interposed between the second conductive layer and the third conductive layer. The touch panel has functions of multi-touch, contact-touch and non-contact touch, and the touch panel can be operated by conductive objects or dielectric objects.

17 Claims, 3 Drawing Sheets

TOUCH PANEL AND DRIVING METHOD OF TOUCH PANEL

CROSS-REFERENCE TO RELATED APPLICATION

This application claims the priority benefit of Taiwan application serial no. 97106063, filed on Feb. 21, 2008. The entirety of the above-mentioned patent application is hereby incorporated by reference herein and made a part of specification.

BACKGROUND OF THE INVENTION

1. Field of the Invention

The present invention relates to a touch panel and a driving method thereof. More particularly, the present invention relates to a touch panel and a driving method thereof, wherein the touch panel is equipped with functions of contact-touch, non-contact touch, and multi-touch and can be operated via objects made of conductive materials or dielectric materials.

2. Description of Related Art

Information technologies (ITs), wireless mobile communications, and information home appliances have been rapidly developed and widely applied. To meet current demands on portable, compact, and user-friendly IT products, touch panels have been introduced as input interfaces in replacement of conventional keyboards or mice.

At this current stage, the touch panels can be categorized into a resistive touch panel and a capacitive touch panel based on their driving manner and structural design. To operate a resistive touch panel, a user should press the resistive touch panel, such that parts of areas within the resistive touch panel are electrically conducted and thereby coordinate signals indicative of coordinates of touch points are produced. This type of touch panel exhibits a disadvantage of low durability. Moreover, the resistive touch panel can only sense a single-touch input, while the resistive touch panel is not able to recognize multi-touch gestures. Hence, consumers' demands on diverse functions of the products cannot be satisfied.

On the contrary, the capacitive touch panel has a multiple touch sensing feature and thus has become more and more popular. In addition, no direct touch contact is required by operating the capacitive touch panel, and therefore the capacitive touch panel is relatively durable in comparison with the resistive touch panel. Moreover, the capacitive touch panel which can be operated in a non-contact manner can be placed within housings of the IT products, so as to look after the consumers' requirements for fantastic exterior designs of the IT products. However, notwithstanding the easy operation, the capacitive touch panel cannot be operated by the users wearing gloves or by means of insulating materials. As such, said two types of the touch panels are barely satisfactory so far and further improvement is deemed necessary.

SUMMARY OF THE INVENTION

The present invention is directed to a touch panel for resolving an issue regarding an inconvenient operation of a conventional touch panel.

The present invention is further directed to a driving method of a touch panel, wherein the driving method enables the touch panel to be operated in a more flexible manner.

The present invention provides a touch panel including a first substrate, a second substrate, a first conductive layer, a second conductive layer, a third conductive layer, and a plurality of spacers. The first substrate has an upper surface and a bottom surface opposite to the upper surface, and the second substrate is parallel to the first substrate. The first conductive layer is disposed on the upper surface of the first substrate, while the second conductive layer is disposed on the bottom surface of the first substrate. Besides, the third conductive layer is disposed on the second substrate and interposed between the second substrate and the second conductive layer. The spacers are interposed between the second conductive layer and the third conductive layer.

According to an embodiment of the present invention, the touch panel further includes a plurality of linear electrodes disposed on the second substrate and positioned around the third conductive layer. In addition, a material of the linear electrodes includes metals. Practically, the material of the linear electrodes is, for example, gold, silver, copper, aluminum, or a combination thereof.

According to an embodiment of the present invention, the first substrate is a flexible substrate.

According to an embodiment of the present invention, the second substrate includes a flexible substrate or a rigid substrate.

According to an embodiment of the present invention, the first conductive layer includes a plurality of bar-shaped conductive patterns substantially arranged in parallel. The second conductive layer also includes, for example, a plurality of bar-shaped conductive patterns substantially arranged in parallel. Here, a long axis of the bar-shaped conductive patterns of the second conductive layer is substantially perpendicular to a long axis of the bar-shaped conductive patterns of the first conductive layer.

According to an embodiment of the present invention, a material of the first conductive layer, the second conductive layer, and the third conductive layer includes an oxide conductive material, such as indium tin oxide (ITO) or indium zinc oxide (IZO).

According to an embodiment of the present invention, the touch panel further includes a planar layer that covers the first substrate.

According to an embodiment of the present invention, the first substrate, the second substrate, the first conductive layer, the second conductive layer, and the third conductive layer are all made of transparent materials.

The present invention further provides a driving method of a touch panel. The driving method is suitable for driving the touch panel described in the above-identified embodiments. In the driving method, a coordinate signal is outputted based on a voltage variation of the second conductive layer or based on a variation of an induced capacitance between the first conductive layer and the second conductive layer.

According to an embodiment of the present invention, the driving method of the touch panel further includes inputting a reference signal to the third conductive layer.

According to an embodiment of the present invention, the driving method of the touch panel further includes detecting the variation of the induced capacitance between the first conductive layer and the second conductive layer.

According to an embodiment of the present invention, the driving method of the touch panel further includes detecting the voltage variation of the second conductive layer.

The resistive touch panel structure and the capacitive touch panel structure are integrated on two substrates according to the present invention, and thus the touch panel of the present invention is characterized by advantages of both the resistive touch panel and the capacitive touch panel. In particular, the touch panel of the present invention is equipped with functions of contact-touch, non-contact touch, and multi-touch.

To make the above and other objectives, features, and advantages of the present invention more comprehensible, several embodiments accompanied with figures are detailed as follows.

DESCRIPTION OF EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
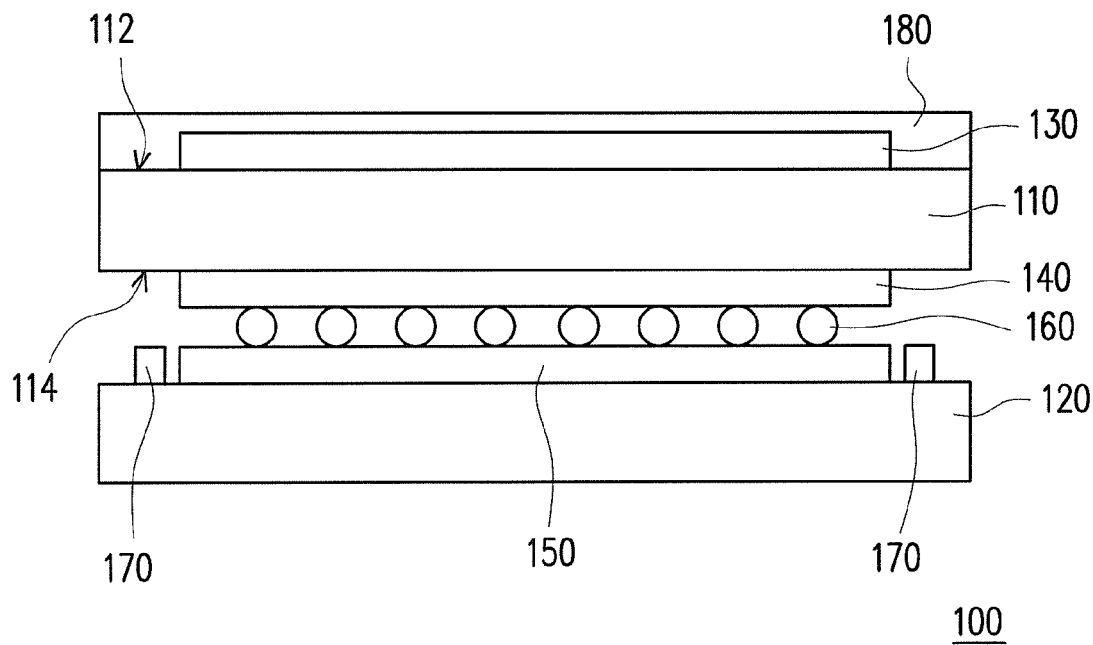
FIG. 1 is a cross-sectional view of a touch panel according to an embodiment of the present invention.

FIG. 1 is a cross-sectional view of a touch panel according to an embodiment of the present invention. Referring to FIG. 1, a touch panel 100 includes a first substrate 110, a second substrate 120, a first conductive layer 130, a second conductive layer 140, a third conductive layer 150, and a plurality of spacers 160. The first substrate 110 has an upper surface 112 and a bottom surface 114 opposite to the upper surface 112, and the second substrate 120 is parallel to the first substrate 110. The first conductive layer 130 is disposed on the upper surface 112 of the first substrate 110, while the second conductive layer 140 is disposed on the bottom surface 114 of the first substrate 110. Besides, the third conductive layer 150 is disposed on the second substrate 120 and interposed between the second substrate 120 and the second conductive layer 140. The spacers 160 are interposed between the second conductive layer 140 and the third conductive layer 150. In addition, a plurality of linear electrodes 170 is further disposed on the second substrate 120.

A material of the first conductive layer 130, the second conductive layer 140, and the third conductive layer 150 is, for example, an oxide conductive material. Currently, some of the common oxide conductive materials include ITO, IZO, and so forth. In general, said oxide conductive materials are transparent, and thus a touch area defined by the first conductive layer 130, the second conductive layer 140, and the third conductive layer 150 in the touch panel 100 is also transparent. Here, the touch panel 100 can be attached to a display panel to form a touch display panel having a touch control feature and an image display function. In order to protect the touch panel 100 and prevent the first conductive layer 130 from being contaminated, a planar layer 180 can be disposed to cover the first conductive layer 130. In addition, the first substrate 110 is made of a flexible material, for example. Namely, the first substrate 110 can be a flexible substrate. On the other hand, the second substrate 120 can be either a flexible substrate or a rigid substrate. The rigid substrate is, for example, a glass substrate or a substrate made of other rigid materials, while the flexible substrate is, for example, made of a plastic material or other flexible materials. Besides, the planar layer 180 can also be made of flexible dielectric materials.

The first substrate 110, the first conductive layer 130, and the second conductive layer 140 can together form a capacitive touch panel having a single substrate structure, while the first substrate 110, the second substrate 120, the second conductive layer 140, the third conductive layer 150, and the plurality of spacers 160 can together form a resistive touch panel. The first substrate 110 made of the dielectric material maintains an appropriate space between the first conductive layer 130 and the second conductive layer 140. A capacitive structure can be formed between the first conductive layer 130 and the second conductive layer 140 in the capacitive touch panel. When a conductive material approaches the first conductive layer 130, an induced capacitance is generated between the first conductive layer 130 and the second conductive layer 140 at a position corresponding to the approaching conductive material. On the other hand, in the resistive touch panel, as a pressure is pointedly applied to the first substrate 110, the flexibility of the first substrate 110 is conducive to electrically conducting between the second conductive layer 140 and the third conductive layer 150. At this time, a corresponding voltage is generated as a sensing signal by the second conductive layer 140 at a position where the pressure is applied to the first substrate 110.

Figure 2:
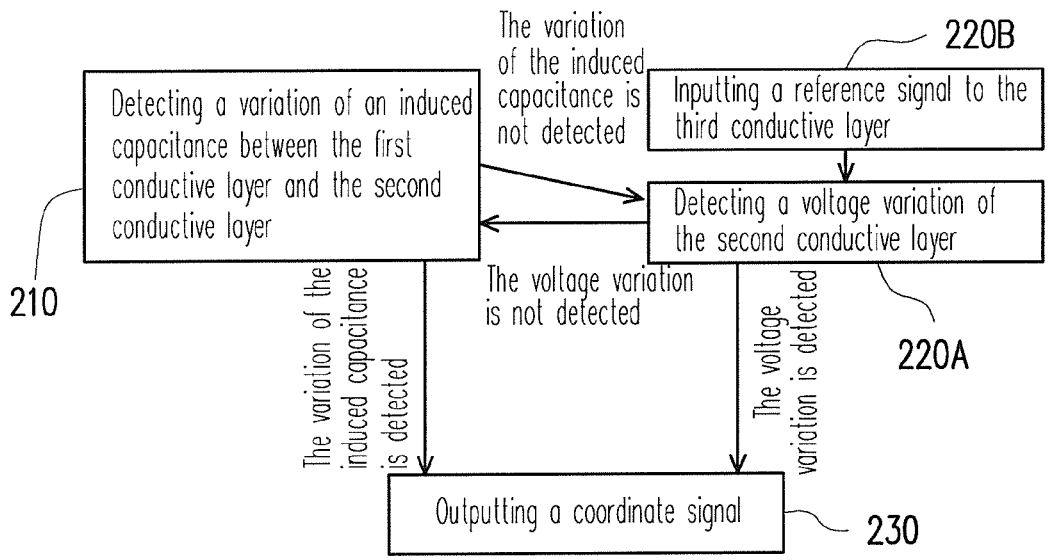
FIG. 2 is a flowchart of a driving method of a touch panel according to an embodiment of the present invention.

FIG. 2 is a flowchart of a driving method of a touch panel according to an embodiment of the present invention. Referring to FIGS. 1 and 2, the driving method is suitable for driving the touch panel 100 illustrated in FIG. 1. In step 210 of the driving method, a variation of an induced capacitance between the first conductive layer 130 and the second conductive layer 140 is detected. In step 220A, a voltage variation of the second conductive layer 140 is detected. Accordingly, a coordinate signal is outputted based on the variation of the induced capacitance or the voltage variation (step 230). In practice, the driving method further includes inputting a reference signal to the third conductive layer 150 before the voltage variation of the second conductive layer 140 is detected (step 220B).

Specifically, the driving method of the touch panel 100 in the present embodiment includes performing step 210, for example. That is to say, the variation of the induced capacitance between the first conductive layer 130 and the second conductive layer 140 is detected. If there exists the variation of the induced capacitance between the first conductive layer 130 and the second conductive layer 140, step 230 can be performed, so as to generate a corresponding coordinate signal based on the variation of the induced capacitance. On the other hand, if no variation of the induced capacitance between the first conductive layer 130 and the second conductive layer 140 occurs, a reference signal is then inputted to the third conductive layer 150 (step 220B), and step 220A is performed to detect the voltage variation of the second conductive layer 140. Here, the voltage variation can be converted to the corresponding coordinate signal (step 230).

When the reference signal is inputted to the third conductive layer 150, step 220A in the driving method of the present embodiment can also be implemented to detect the voltage variation of the second conductive layer 140. If there exists the voltage variation of the second conductive layer 140, the voltage variation is converted to the coordinate signal (step 230). By contrast, if there is no voltage variation of the second conductive layer 140, step 210 is carried out to convert the variation of the induced capacitance between the first conductive layer 130 and the second conductive layer 140 to the coordinate signal (step 230). Namely, it is not limited in the present invention to first detect the variation of the induced capacitance between the first conductive layer 130 and the second conductive layer 140 or to first detect the voltage variation of the second conductive layer 140. When only one of the electrical parameters is detected and obtained, the corresponding coordinate signal can then be produced. In other words, a control circuit can drive the touch panel 100 merely by having one of the two parameters varied.

Figure 3A:
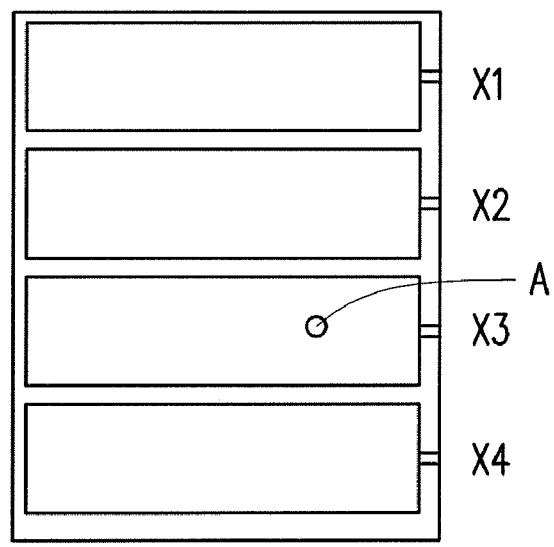
FIG. 3A is a schematic top view of a first conductive layer of the touch panel depicted in FIG. 1 according to the present invention.
Figure 3B:
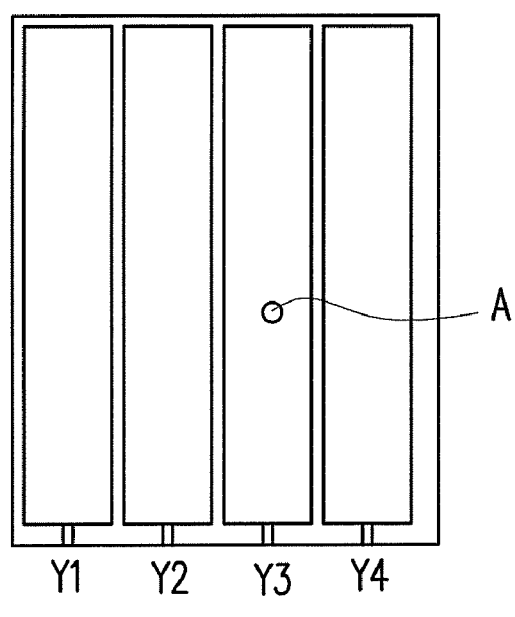
FIG. 3B is a schematic top view of a second conductive layer of the touch panel depicted in FIG. 1 according to the present invention.
Figure 3C:
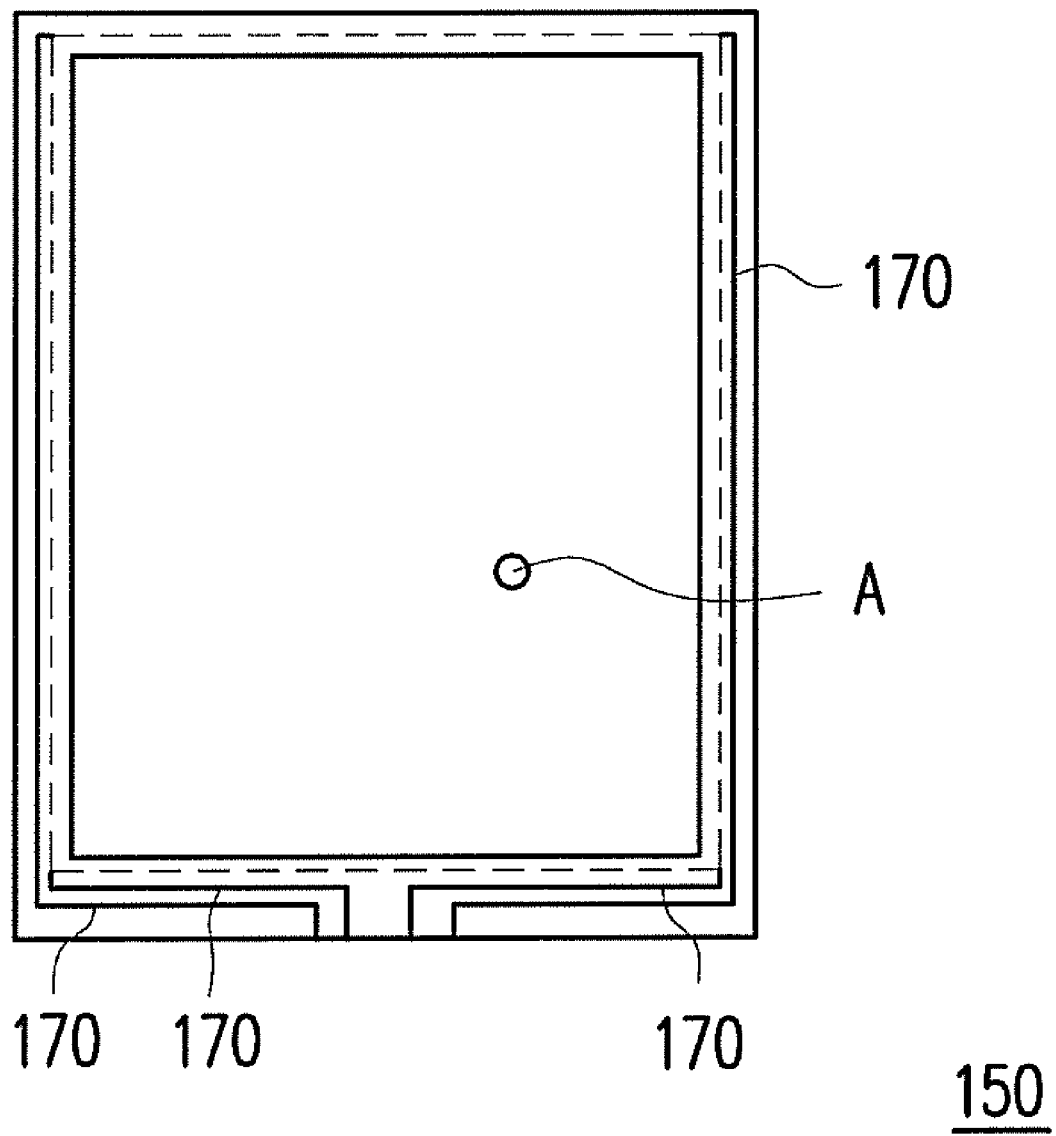
FIG. 3C is a schematic top view of a third conductive layer of the touch panel depicted in FIG. 1 according to the present invention.

FIGS. 3A through 3C are schematic top views respectively illustrating the first conductive layer, the second conductive layer, and the third conductive layer of the touch panel depicted in FIG. 1 according to the present invention. Referring to FIGS. 3A and 3B, the first conductive layer 130 and the second conductive layer 140 are composed of a plurality of bar-shaped conductive patterns X1~X4 and Y1~Y4, respectively. The bar-shaped conductive patterns X1~X4 are approximately in parallel, and so are the bar-shaped conductive patterns Y1~Y4. An extending direction of the bar-shaped conductive patterns X1~X4 intersects an extending direction of the bar-shaped conductive patterns Y1~Y4, whereas practically the said two extending directions can also be perpendicular to each other. Parts of the regions occupied by the bar-shaped conductive patterns X1~X4 and Y1~Y4 are overlapped. Besides, the third conductive layer 150 depicted in FIG. 3C is not patterned. In other words, the third conductive layer 150 is a single electrode instead of multiple electrodes. A plurality of linear electrodes 170 is disposed around the third conductive layer 150, and a material of the linear electrodes 170 is, for example, aluminum, silver, copper, gold, or other metals. Practically, the second conductive layer 140, the spacers 160, the third conductive layer 150, and the linear electrodes 170 interposed between the second substrate 120 and the first substrate 110 together form a five-wire resistive touch panel, for example. On the other hand, boundaries of each of the bar-shaped conductive patterns X1~X4 and Y1~Y4 can partially or entirely have a non-straight linear shape, such as a subtle wave shape or a subtle saw tooth shape.

In particular, referring to FIGS. 3A through 3C, as the conductive material including a user's hand without wearing any glove or a stylus made of the conductive material approaches or directly contacts a point A on the first conductive 130, the variation of the induced capacitance is generated between the bar-shaped conductive patterns X3 and Y3. The variation of the induced capacitance can be converted to the corresponding coordinate signal by means of a converter in the control circuit. Here, the user's hand or the conductive stylus may not be required to be in direct contact with the first conductive layer 130. It is likely for the user's hand or the conductive stylus to merely approach the point A, such that the corresponding induced capacitance between the first conductive layer 130 and the second conductive layer 140 can be generated. Hence, the touch panel 100 can be driven even though the touch panel is not directly touched. Moreover, given that the point A of the touch panel 100 is contacted by a non-conductive material, the capacitance between the bar-shaped conductive patterns X3 and Y3 is not varied, and thus the medium used by the user for driving the touch panel 100 must actually contact the point A of the touch panel 100. In an alternative, the point A of the touch panel 100 must be pressed for driving the touch panel 100. As such, the bar-shaped conductive pattern Y3 and the third conductive layer 150 can be electrically conducted at the point A, such that the bar-shaped conductive pattern Y3 is able to detect the voltage of the third conductive layer 150 corresponding to the point A. Thereby, the converter can generate the corresponding coordinate signal based on the detecting voltage.

In general, IT products using the touch panel 100 can perform various functions by means of the coordinate signal converted based on the voltage variation of the second conductive layer 140 or based on the variation of the induced capacitance between the first conductive layer 130 and the second conductive layer 140. That is to say, the touch panel 100 can be operated by the user's hand, the stylus, or other media, such that touch panel 100 can be more user-friendly. Besides, the induced capacitance at different corresponding positions between the first conductive layer 130 and the second conductive layer 140 can be detected. As a result, the touch panel 100 is equipped with the multi-touch function.

To sum up, the touch panel of the embodiment has both the resistive touch panel structure and the capacitive touch panel structure. Therefore, the touch panel of the embodiment is characterized by advantages of both the resistive touch panel and the capacitive touch panel. The touch panel of the present invention can output the corresponding coordinate signal when the touch panel is approached or contacted by user's fingers, the stylus, or other tools. Thereby, the touch panel can be operated in a user-friendly manner. Moreover, the touch panel of the embodiment is able to sense the capacitance variation at various points simultaneously; therefore, the touch panel is capable of multi-touch function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
   a first substrate having an upper surface and a bottom surface opposite to the upper surface;
   a second substrate parallel to the first substrate;
   a first conductive layer disposed on the upper surface of the first substrate;
   a second conductive layer disposed on the bottom surface of the first substrate;
   a third conductive layer disposed on the second substrate and interposed between the second substrate and the second conductive layer; and
   a plurality of spacers interposed between the second conductive layer and the third conductive layer, wherein the first substrate, the first conductive layer, and the second conductive layer form a capacitive touch panel, and the first substrate, the second substrate, the second conductive layer, the third conductive layer, and the plurality of spacers form a resistive touch panel.

2. The touch panel as claimed in claim 1, further comprising a plurality of linear electrodes disposed on the second substrate and positioned around the third conductive layer, wherein the third conductive layer is a single electrode.

3. The touch panel as claimed in claim 2, wherein a material of the linear electrodes comprises metals.

4. The touch panel as claimed in claim 2, wherein a material of the linear electrodes comprises gold, silver, copper, aluminum, or a combination thereof.

5. The touch panel as claimed in claim 2, wherein the second conductive layer, the spacers, the third conductive layer, and the linear electrodes interposed between the second substrate and the first substrate together form a five-wire resistive touch panel.

6. The touch panel as claimed in claim 1, wherein the first substrate is a flexible substrate and the second substrate is a flexible substrate or a rigid substrate.

7. The touch panel as claimed in claim 1, wherein the first conductive layer comprises a plurality of bar-shaped conductive patterns substantially arranged in parallel.

8. The touch panel as claimed in claim 7, wherein the second conductive layer comprises a plurality of bar-shaped conductive patterns substantially arranged in parallel.

9. The touch panel as claimed in claim 8, wherein a long axis of the bar-shaped conductive patterns of the second conductive layer is substantially perpendicular to a long axis of the bar-shaped conductive patterns of the first conductive layer.

10. The touch panel as claimed in claim 1, wherein a material of the first conductive layer, the second conductive layer, and the third conductive layer comprises an transparent oxide conductive material.

11. The touch panel as claimed in claim 10, wherein the oxide conductive material comprises indium tin oxide (ITO) or indium zinc oxide (IZO).

12. The touch panel as claimed in claim 1, further comprising a planar layer covering the first conductive layer.

13. The touch panel as claimed in claim 1, wherein the first substrate, the second substrate, the first conductive layer, the second conductive layer, and the third conductive layer are made of transparent materials.

14. A driving method of a touch panel, the touch panel comprising:
a first substrate, having an upper surface and a bottom surface opposite to the upper surface;
a second substrate, parallel to the first substrate;
a first conductive layer, disposed on the upper surface of the first substrate;
a second conductive layer, disposed on the bottom surface of the first substrate;
a third conductive layer, disposed on the second substrate and interposed between the second substrate and the second conductive layer; and
a plurality of spacers, interposed between the second conductive layer and the third conductive layer, wherein the driving method comprises outputting a coordinate signal based on a voltage variation of the second conductive layer or based on a variation of an induced capacitance between the first conductive layer and the second conductive layer.

15. The driving method of the touch panel as claimed in claim 14, further comprising inputting a reference signal to the third conductive layer.

16. The driving method of the touch panel as claimed in claim 14, further comprising detecting the variation of the induced capacitance between the first conductive layer and the second conductive layer.

17. The driving method of the touch panel as claimed in claim 14, further comprising detecting the voltage variation of the second conductive layer.

* * * * *